United States Patent
Kaneko et al.

(10) Patent No.: US 6,930,068 B2
(45) Date of Patent: Aug. 16, 2005

(54) METHANOL REFORMING CATALYST

(75) Inventors: Hiroaki Kaneko, Yokohama (JP); Fumihiro Haga, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 423 days.

(21) Appl. No.: 09/735,913

(22) Filed: Dec. 14, 2000

(65) Prior Publication Data

US 2001/0021469 A1 Sep. 13, 2001

(30) Foreign Application Priority Data

Dec. 15, 1999 (JP) ............................................. 11-356633
Dec. 4, 2000 (JP) ........................................ 2000-368626

(51) Int. Cl.⁷ .......................... H01M 4/88; H01M 6/00; H01M 4/90; B01J 23/42; B01J 23/44
(52) U.S. Cl. ...................... 502/101; 502/339; 29/623.5; 429/40; 429/44
(58) Field of Search ........................... 29/623.5; 429/44, 429/40; 502/101, 339

(56) References Cited

U.S. PATENT DOCUMENTS

| | | | |
|---|---|---|---|
| 4,058,485 A | * | 11/1977 | Cheung ....................... 502/331 |
| 4,175,115 A | * | 11/1979 | Ball et al. ................. 423/418.2 |
| 4,498,942 A | * | 2/1985 | Asano et al. ................ 156/151 |
| 5,346,871 A | | 9/1994 | Robbins |
| 5,899,678 A | | 5/1999 | Thomson |
| 6,413,449 B1 | * | 7/2002 | Wieland et al. ............. 252/373 |

FOREIGN PATENT DOCUMENTS

| | | | |
|---|---|---|---|
| DE | 253160 | 11/1912 | |
| DE | 24 60 078 A | 7/1975 | |
| EP | 0 717 727 B1 | 11/1998 | |
| JP | 57-7255 | * 1/1982 | ............ B01J/23/60 |
| JP | 05-049930 | 3/1993 | |
| JP | 6-231771 | * 8/1994 | ............ H01M/4/86 |
| JP | 07-116517 | 5/1995 | |
| JP | 08-089802 | 4/1996 | |
| WO | WO 89/00886 A1 | 2/1989 | |

* cited by examiner

Primary Examiner—Patrick Ryan
Assistant Examiner—Julian Mercado
(74) Attorney, Agent, or Firm—Foley & Lardner LLP

(57) ABSTRACT

A methanol reforming catalyst that generates a reformed gas containing hydrogen by reforming methanol in the atmosphere containing oxygen and steam contains a metal oxide support and Pd—Zr alloy with which the metal oxide support is impregnated. The reforming catalyst accelerate a steam reforming reaction of the methanol as an endothermic reaction and a partial oxidation reaction of the methanol as an exothermic reaction while suppressing generation of CO gas. Also, a methanol reforming apparatus having the methanol reforming catalyst does not need a heater for the reforming reaction.

12 Claims, 3 Drawing Sheets

FIG.4

Table

| Example | Catalyst No | Composition of catalyst supported material/(support) | Pd:Zu (mol ratio) | Burning temperature (°C) | Reducing temperature (°C) | Reformation rate (%) | CO concentration (%) |
|---|---|---|---|---|---|---|---|
| example 1 | catalyst 1 | 5%Pd-3.06%Zn/(68%CeO2-32%ZrO2) | 1:1 | 500 | 500 | 98 | 2.5 |
| example 2 | catalyst 2 | 5%Pd-6.12%Zn/(68%CeO2-32%ZrO2) | 1:2 | 500 | 500 | 99.8 | 2.1 |
| example 3 | catalyst 3 | 5%Pd-30.6%Zn/(68%CeO2-32%ZrO2) | 1:10 | 500 | 500 | 99.3 | 1.1 |
| example 4 | catalyst 4 | 5%Pd-6.12%Zn/CeO2 | 1:2 | 500 | 500 | 98.8 | 2.2 |
| example 5 | catalyst 5 | 5%Pd-6.12%Zn/ZrO2 | 1:2 | 500 | 500 | 99.7 | 2.3 |
| example 6 | catalyst 6 | 5%Pd-6.12%Zn/(20%CeO2-80%ZrO2) | 1:2 | 500 | 500 | 99.5 | 2.2 |
| example 7 | catalyst 7 | 5%Pd-6.12%Zn/(68%CeO2-32%ZrO2) | 1:2 | 400 | 400 | 98.3 | 2.3 |
| example 8 | catalyst 8 | 5%Pd-6.12%Zn/(68%CeO2-32%ZrO2) | 1:2 | 600 | 600 | 98.5 | 2.1 |
| comparative example 1 | catalyst 9 | 5%Pd/(68%CeO2-32%ZrO2) | | 500 | 500 | 92 | 10.5 |
| comparative example 2 | catalyst 10 | Cu-ZnO | | 400 | 400 | 85 | 1.1 |
| comparative example 3 | catalyst 11 | 5%Pd/ZnO | 1:20 | 500 | 500 | 89 | 2.4 |

METHANOL REFORMING CATALYST

BACKGROUND OF THE INVENTION

1. Field of the Invention

The present invention relates to a catalyst used in a reaction for manufacturing a hydrogen gas by reforming a hydrogen-containing gas such as methanol, etc. More particularly, the present invention relates to a catalyst required for a methanol gas reforming reaction to generate the hydrogen-containing gas that is suitable for a fuel gas supplied to a fuel cell used in a power source, etc. of a mobile body.

2. Description of the Related Art

The fuel cell is a device for converting directly a chemical energy of a fuel into an electrical energy, and can achieve high energy conversion efficiency. A main fuel used for the fuel cell is hydrogen, nevertheless a fuel gas (reformed gas) containing the hydrogen and carbon dioxide except the hydrogen may be used for the fuel cell such as a polymer electrolyte fuel cell, a phosphoric acid fuel cell, a molten carbonate fuel cell, etc. Therefore, a reformer is provided in a fuel cell system having such fuel cell, and the fuel (hydrogen-containing fuel) is reformed in this reformer to generate the reformed gas containing the hydrogen.

For example, a steam reforming reaction for reforming a methanol as an example of the hydrogen-containing fuel by using a steam to generate the hydrogen is expressed by following Eq. (f1).

$$CH_3OH + H_2O \rightarrow CO_2 + 3H_2 \qquad (f1)$$

Since the reforming reaction expressed by this Eq. (f1) is endothermic reaction, a burner, a heater, or the like is provided to the reformer to heat it and thus a heat quantity necessary for the above reforming reaction is supplied to start and keep the reforming reaction. A catalyst containing Cu as a major component is used in the reforming reaction expressed by Eq. (f1).

SUMMARY OF THE INVENTION

However, in case the heating burner is provided to the reformer to supply the heat quantity necessary for the above reforming reaction, not only the burner but also the pipe for supplying the fuel, an air, etc., for combustion to the burner must be provided. As a result, a configuration of the system becomes complicated and thus a size of the overall system is increased.

Also, a copper-based catalyst is excellent in low temperature activity, selectivity, etc., but has the problem of heat resistance. In particular, since the activity and the selectivity are extremely reduced under the high temperature in excess of 300° C., it is difficult to use such catalyst for a long time under the high temperature. In addition to this, metallic Cu as active species is oxidized and sintered under the atmosphere containing the oxygen to cause the reduction in the activity.

In contrast, a Pd-based catalyst that has strong resistance against the high temperature oxidizing atmosphere has the problem that it promotes the decomposition reaction of the methanol and thus generates a large quantity of carbon monoxide (CO) that is injurious to the fuel cell.

The present invention has been made in view of such subjects in the prior art, and it is a first object of the present invention to provide a methanol reforming catalyst capable of maintaining a high activity with good stability even in a high temperature and oxygen atmosphere while suppressing CO generation.

It is a second object of the present invention to provide a method of manufacturing the above methanol reforming catalyst.

It is a third object of the present invention to provide a reformer having the above methanol reforming catalyst.

It is a fourth object of the present invention to provide a fuel cell system using the above reformer.

In order to achieve the above objects, a methanol reforming catalyst of the present invention comprises a metal oxide support, and Pd—Zn alloy that is impregnated in the metal oxide support.

According to the above methanol reforming catalyst, since a Pd component is alloyed with the Zn, generation of CO due to the methanol decomposition reaction is suppressed. Also, since both the Pd—Zn alloy and the metal oxide as the support are stable in the high temperature oxidizing atmosphere, the partial oxidation reaction as the exothermic reaction using the oxygen gas is proceeded simultaneously with the steam reforming reaction as the endothermic reaction or prior to the steam reforming reaction. That is, auto thermal reaction that proceeds the steam reforming reaction by utilizing the heat generated by the partial oxidation reaction is proceeded stably.

As the metal oxide support, any one of the Ce oxide, the Zr oxide, and the Ce—Zr complex oxide may be used. Also the Pd—Zn alloy may contain Ce and/or Zr.

Meanwhile, the methanol reforming catalyst of the present invention is a catalyst that has any compound of the palladium-zinc-cerium (Pd—Zn—Ce) based compound, the palladium-zinc-zirconium (Pd—Zn—Zr) based compound, and the palladium-zinc-cerium-zirconium (Pd—Zn—Ce—Zr) based compound.

A method of producing the methanol reforming catalyst of the present invention is a method of fabricating the methanol reforming catalyst of the above present invention that comprises the steps of impregnating a metal oxide with a solution containing Pd and Zn, and burning the metal oxide that is impregnated with Pd and Zn.

A methanol reformer of the present invention comprises an inlet port of a gas, a reaction vessel having the methanol reforming catalyst of the present invention in its inside and causing a reforming reaction of a gas supplied from the gas inlet port, and an outlet port of the gas reformed in the reaction vessel.

In addition, a methanol reforming apparatus of the present invention comprises a methanol supply source, an oxygen supply source, a steam supply source, the above mentioned methanol reformer and a pipe supplying methanol, oxygen, and steam that are supplied from respective supply sources to the methanol reformer.

According to the methanol reformer or the methanol reforming apparatus, both the steam reforming reaction as the endothermic reaction and the partial oxidation reaction as the exothermic reaction can be proceeded simultaneously with the intervention of the above methanol reforming catalyst of the present invention by supplying the methanol, the oxygen, the steam to the reaction vessel. Since the heat necessary for the steam reforming reaction is supplied by the partial oxidation reaction, the external heater such as the burner, etc. can be omitted. Accordingly, the reformer or the methanol reforming apparatus can be small and simplified.

A fuel cell of the present invention comprises the methanol reforming apparatus of the present invention, a fuel cell, a pipe supplying a gas reformed by the reforming apparatus to the fuel cell, and a pipe supplying an oxygen-containing gas to the fuel cell.

According to the above fuel cell system of the present invention, since the reforming apparatus having the above methanol reforming catalyst of the present invention is used, the size reduction of the overall fuel cell system can be achieved. Therefore, the fuel cell system of the present invention is suitable for the fuel cell system which is installed in the mobile body such as a car, a ship, etc. whose apparatus size is limited.

BRIEF DESCRIPTION OF THE DRAWINGS

FIG. 4 is a table showing catalyst characteristics under manufacturing conditions of the methanol reforming catalyst according to the embodiment of the present invention.

DESCRIPTION OF THE PREFERRED EMBODIMENTS

Figure 1A:
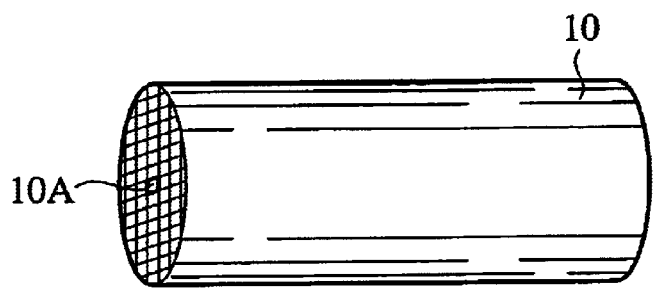
FIG. 1A is a perspective view showing a methanol reforming catalyst in which a catalyst layer is coated on inner walls of respective cells of a monolithic substrate according to an embodiment of the present invention.

A methanol reforming catalyst according to an embodiment of the present invention has such a feature that it contains Pd—Zn alloy-impregnated metal oxide support as a catalyst activating substance.

Now any material may be used as the metal oxide support if it is stable for the high temperature oxidizing atmosphere. For example, preferably Ce oxide, Zr oxide, Ce—Zr complex oxide, or the like should be used.

In general, noble metal materials such as Pd, etc. are good in such a respect that they are stable in the high temperature oxidizing atmosphere. However, if Pd catalyst in which alumina is impregnated with Pd single substance is used in a methanol reforming reaction, a methanol decomposition reaction expressed by following Eq. (f2) is promoted and thus carbon monoxide (CO) that is harmful for an operation of the fuel cell is generated.

$$CH_3OH \rightarrow CO + 2H_2 \quad (f2)$$

However, in the methanol reforming catalyst according to the embodiment, since a Pd component is alloyed with Zn, generation of CO due to the above methanol decomposition reaction expressed by following Eq. (f2) can be suppressed while holding the high temperature stability.

Also, if the Zn component is alloyed with Pd, sintering of the Zn component can be prevented even under the oxygen sufficient and relatively high temperature (e.g., 400 to 500° C.) condition and thus such Zn component can still maintain the catalytic activity.

Since both a Pd—Zn alloy and the metal oxide such as the Ce oxide, the Zr oxide, the Ce—Zr complex oxide, or the like have the sufficient stability under the high temperature oxidizing atmosphere, the methanol reforming catalyst according to the embodiment can be used as the catalyst in not only a steam reforming reaction expressed by following Eq. (f1) but also a partial oxidation reaction using an oxidizing gas and expressed by following Eq. (f3).

$$CH_3OH + H_2O \rightarrow CO_2 + 3H_2 \quad (f1)$$

$$CH_3OH + \tfrac{1}{2}O_2 \rightarrow CO_2 + 2H_2 \quad (f3)$$

Since the steam reforming reaction (f1) is the endothermic reaction while the partial oxidation reaction (f3) is the exothermic reaction, heating applied from the outside to start or continue the steam reforming reaction (f1) can be reduced or omitted if both reactions are simultaneously caused or the partial oxidation reaction (f3) is caused prior to the steam reforming reaction (f1).

In addition, since the methanol reforming catalyst according to the embodiment can be used at the high temperature, a reaction speed can be accelerated by executing the reforming reaction at the higher temperature. Therefore, an efficiency of the reforming reaction can be improved and also there is no need to pay excessive attention to the reduction in the catalytic activity due to the high temperature. As a result, structure design to achieve the balanced heating in the reformer, etc. can be simplified.

Here it is preferable that a weight ratio of Pd and Zn in the Pd—Zn alloy should be set to a ratio of Pd:Zn=1.1 to 1:50, preferably 1:1 to 1:10. If a rate of Pd is smaller than an amount defined in this range, the catalytic activity is reduced. Also, if an amount of Pd is larger than an amount of Zn, a Pd single substance that is not alloyed is present to accelerate the CO generation. Thus, this situation is not preferable.

In this case, this methanol reforming catalyst may contain other component except the catalytic compound. For example, in order to enlarge a reaction surface area, large specific surface area base material such as alumina, silica, or the like, that is impregnated with the above catalytic compound, may be used.

Figure 1B:
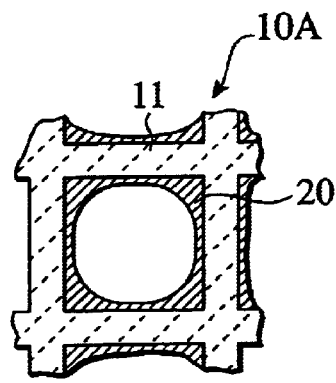
FIG. 1B is an enlarged sectional view showing the cell of the monolithic substrate shown in FIG. 1A.

FIG. 1A is a perspective view showing an example of the methanol reforming catalyst according to the present embodiment. The methanol reforming catalyst according to the present embodiment is coated on the ceramic or metal honeycomb monolithic substrate, as shown in FIG. 1A, for example. The monolithic substrate has a plurality of hollow cells 10A. As shown in FIG. 1B, a catalyst layer 20 containing the above catalytic material according to the present embodiment is coated on inner surfaces of respective hollow cells 10A.

A shape of the catalyst is not particularly limited if such catalyst can be arranged in a reaction vessel of the reformer. A grain-like shape or a pellet-like shape may be used.

Figure 2:
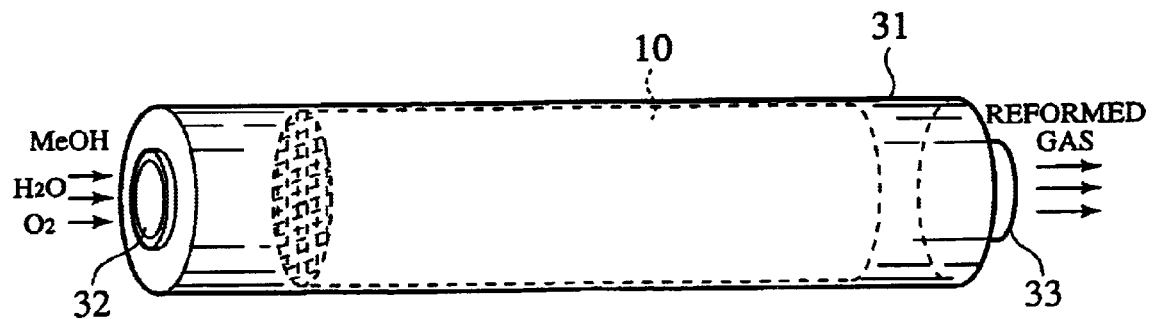
FIG. 2 is a perspective view showing a reformer having the methanol reforming catalyst.

FIG. 2 shows a methanol reformer according to the present embodiment. As shown in FIG. 2, the reformer has a reactor vessel 31 in which a reforming reaction is performed and the methanol reforming catalyst 10 is contained in the reactor vessel 31. A gas inlet port 32 for introducing a methanol gas, a steam gas, and an oxygen gas is provided to one end of the reactor vessel 31, while a gas outlet port 33 for outputting the reformed gas is provided to the other end of the reactor vessel 31.

The reactor vessel 31 is not particularly limited if mainly the partial oxidation reaction and the steam reforming reaction of the supplied methanol, oxygen, and steam can be performed, and any vessel may be used if it can withstand the high temperature and the pressure to some extent. Also, this vessel is not limited to the pipe shape, as shown in FIG. 2. Any shape or any structure of the vessel may be used if the methanol reforming catalyst may be filled into the vessel.

In addition, there is no need to provide a single gas inlet port 32, and a plurality of gas inlet ports 32 may be provided.

Next, an example of a method of manufacturing the methanol reforming catalyst according to the present embodiment will be explained hereunder. The catalyst according to the present embodiment can be obtained by mixing Pd and Zn nitrates at a predetermined ratio, then immersing the Ce or Zr oxide or the Ce—Zr complex oxide as the metal oxide into the resultant mixed solution, and then drying and burning the resultant oxide.

More particularly, in order to fabricate the catalyst shown in FIG. 1A, first a Pd—Zn mixed solution is prepared by weighting nitrates of Pd and Zn metals at a predetermined ratio and then dissolving them into a pure water. Then, the Ce or Zr oxide or the Ce—Zr complex oxide is added into this Pd—Zn mixed solution, and then the metal oxide is impregnated with Pd and Zn by sufficiently stirring/mixing them. Then, catalyst powders are obtained by drying the mixed solution into which the metal oxide is added at 150° C. and then burning it at 400 to 600° C.

In This case, when the metal oxide is impregnated with Pd and Zn, first the oxide may be impregnated with Zn and then the oxide may be impregnated with Pd. That is, the metal oxide is added into the Zn containing solution, and then Pd may be added thereinto. In this case, since the Pd is accelerated to be alloyed with the Zn, the methanol decomposition reaction due to Pd can be effectively suppressed. As a result, generation of CO can be suppressed further more.

If the burning temperature after the impregnation is less than 400° C., alloying of Pd and Zn is insufficient and thus the generation of CO due to Pd single substance is increased. In contrast, if such burning temperature exceeds more than 600° C., sintering of the Pd—Zn alloy is generated and thus a catalytic activity is decreased.

Then, the slurry is obtained by grinding/mixing the resultant catalyst powders with the nitric acid sol containing the alumina or silica by using a planetary ball mill. At this time, it is preferable that a contained amount of alumina or silica should be set to less than 10 weight %. The contained amount of alumina or silica that exceeds more than 10 weight % is not preferable since an amount of the catalyst powder component is relatively reduced.

After this, the above slurry is coated on the monolithic substrate. Then, the resultant is burned at 400° C. in the air and then is reduced at 400° C. in the hydrogen. In this manner, the methanol reforming catalyst shown in FIG. 1A can be provided.

Figure 3:
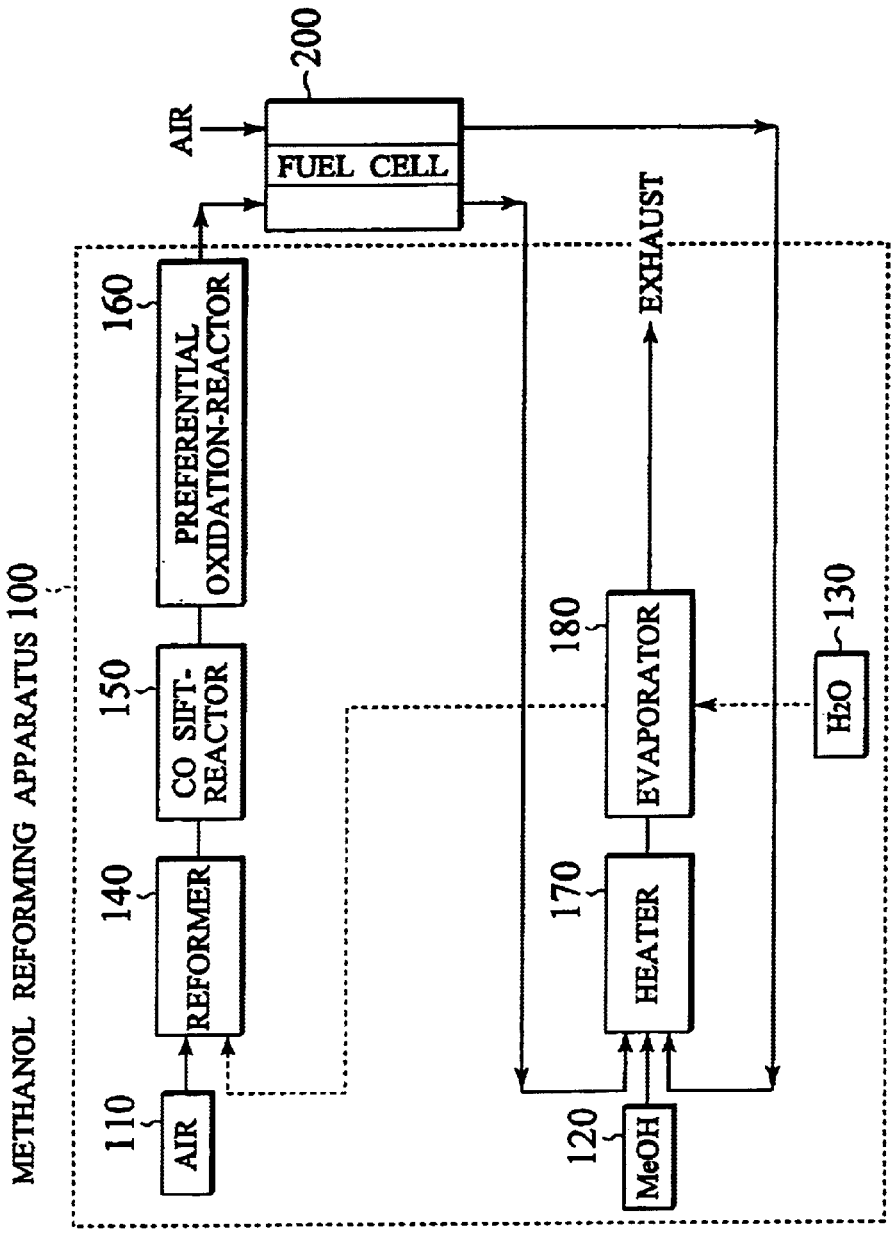
FIG. 3 is a view showing an example of a configuration of a fuel cell system comprising a methanol reforming apparatus according to an embodiment of the present invention.

FIG. 3 is a view showing an example of a configuration of a fuel cell system having the methanol reforming apparatus according to an embodiment of the present invention. As shown in FIG. 3, respective gases are introduced into a reformer 140 via an oxygen supply source 110, a methanol supply source 120, and a steam supply source 130. The methanol is gasified by a heater 170, then mixed into the steam by an evaporator 180, and then introduced into the reformer 140. The air is introduced as the oxygen-containing gas. These gases are reformed into the hydrogen-containing gas in the reformer 140 with the intervention of the methanol reforming catalyst according to the above embodiment.

In the methanol reforming apparatus 100 according to the present embodiment, the CO gas in the reformed gas has originally a low CO concentration. In addition, it is preferable that the CO concentration in the reformed gas should be further reduced by a CO sift-reactor 150 and a preferential oxidation-reactor 160. Finally, it is preferable that the CO concentration in the reformed gas introduced into the fuel cell should be reduced into less than 40 ppm to 50 ppm.

A fuel cell 200 includes a unit cell that has a structure in which a fuel electrode (anode) and an air electrode (cathode) are opposed to each other via an electrolyte. The reformed gas in which CO is reduced is supplied to the fuel electrode and, for example, the air containing the oxygen is supplied to the air electrode. These gases can generate an electromotive force based on the electrochemical reaction and also generate the steam. The exhaust gas containing the hydrogen and the exhaust gas containing the air are returned to the heater 170 and the evaporator 180 and are re-used as the fuel gas. Any fuel cell may be used as the fuel cell 200, however, the polymer electrolyte fuel cell is preferably used.

In this case, the oxygen supply source 110, the methanol supply source 120, and the steam supply source 130 may be used enoughly if they can supply the methanol, the oxygen, and the steam to the reformer 140 respectively, and various vessels and bombs can be exemplified.

The connection between respective gas supply sources and the reformer 140 and the connection between the reformer 140 and the fuel cell 200 can be provided by appropriate pipes. Various sensors such as a flowmeter, a pressure gauge, a thermometer, etc. and a pressure-supplying means such as a pump, etc. can be arranged in the middle of such pipes, and thus supply of respective materials such as the methanol, etc. can be controlled.

Since the partial oxidation reaction of the methanol is carried out prior to the steam reforming reaction or substantially simultaneously, a methanol supplying path and an oxygen supplying path may be joined at the upper stream side than the reformer.

Examples of the methanol reforming catalyst according to the present embodiment will be explained hereunder.

EXAMPLE #1

The Pd and Zn nitrates were mixed such that a mole ratio of Pd:Zn was set to 1:1. More particularly, the Pd—Zn mixed solution was prepared by mixing a palladium nitrate solution [Pd($NO_3$)$_2$ solution, Pd concentration: 26.5 wt %] 188.7 g and a zinc nitrate [Zn($NO_3$)$_2$.6$H_2O$] 139.8 g within a pure water, and then stirring them sufficiently.

Then, catalyst powders were prepared by impregnating the Ce—Zr oxide 500 g with the above mixed solution, then drying them at 150° C., and then burning them at 500° C.

The catalyst micro powder slurry was obtained by grinding/mixing the resultant catalyst powder 100 g and the 8 weight % nitric acid alumina sol (mixed solution of boehmite alumina 13 g and 10 weight % nitric acid aqueous solution 87 g) 100 g by using the planetary ball mill for two hours.

A coat layer weight 200 g/L-substrate was obtained by coating the resultant slurry on the ceramic monolithic substrate (400 cells, 0.119 cc), then drying it at 150° C. for 10 minutes, and then burning it at 500° C. in the air. In addition, a methanol reforming catalyst 1 was prepared by reducing this coat layer weight 200 g/L-substrate in the hydrogen stream at 500° C. for one hour.

Under the test condition described later, a reformation rate of this methanol reforming catalyst 1 was 89% and a CO concentration in the gas reformed by this methanol reforming catalyst 1 was 2.5%.

EXAMPLE #2

Nitrates of respective elements were mixed to get a mole ratio of Pd:Zn=1.2. More particularly, a mixed solution was formed by weighting a palladium nitride solution [Pd($NO_3$)$_2$ solution, Pd concentration: 26.5 wt %] 188.7 g and a zinc nitride [Zn(NO$_3$)$_2$.6H$_2$O] 279.6 g, then mixing them with a pure water, and then stirring them sufficiently. A methanol reforming catalyst 2 was prepared by using the same fabrication conditions as the Example 1 except the above.

Under the test condition described later, the reformation rate of this methanol reforming catalyst 2 was 99.8% and the CO concentration in the gas reformed by this methanol reforming catalyst 2 was 2.5%.

EXAMPLE #3

Nitrates of Pd and Zn were mixed to get a mole ratio of Pd:Zn=1:10. A methanol reforming catalyst 3 was prepared by using the same fabrication conditions as the Example 1 except the above.

Under the test condition described later, the reform ratio of this methanol reforming catalyst 3 was 99.3% and the CO concentration in the gas reformed by this methanol reforming catalyst 3 was, 1.1%.

EXAMPLE #4

The catalyst powders were obtained by impregnating the Ce oxide 500 g with the Pd—Zn mixed solution, then drying them at 150° C., and then burning them at 500° C. A methanol reforming catalyst 4 was prepared by using the same fabrication conditions as the Example 2 except the above.

Under the test condition described later, the reform ratio of this methanol reforming catalyst 4 was 98.8% and the CO concentration in the gas reformed by this methanol reforming catalyst 4 was 2.2%.

EXAMPLE #5

The catalyst powders were obtained by impregnating the Zr oxide 500 g with the Pd—Zn mixed solution, then drying them at 150° C., and then burning them at 500° C. A methanol reforming catalyst 5 was prepared by using the same fabrication conditions as the Example 2 except the above.

Under the test condition described later, the reform ratio of this methanol reforming catalyst 5 was 99.7% and the CO concentration in the gas reformed by this methanol reforming catalyst 5 was 2.3%.

EXAMPLE #6

A mole ratio of Ce:Zr of the Ce—Zr oxide was adjusted such that an amount of Zr becomes larger. A methanol reforming catalyst 6 was prepared by using the same fabrication conditions as the Example 1 except the above.

Under the test condition described later, the reform ratio of this methanol reforming catalyst 6 was 99.5% and the CO concentration in the gas reformed by this methanol reforming catalyst 6 was 2.2%.

EXAMPLE #7

The catalyst powders in which the Ce—Zr oxide 500 g was impregnated with the Pd—Zn mixed solution were burned at 400° C. Then, the catalyst micro powder slurry was coated on the ceramic monolithic substrate and then the coat layer was burned in the air at 400° C. Then, the coat layer was reduced in the hydrogen stream at 400° C. In other words, the burning temperatures and the reducing temperature were set to 400° C. respectively. A methanol reforming catalyst 7 was prepared by using the same fabrication conditions as the Example 2 except the above.

Under the test condition described later, the reformation rate of this methanol reforming catalyst 7 was 98.3% and the CO concentration in the gas reformed by this methanol reforming catalyst 6 was 2.3%.

EXAMPLE #8

The burning temperatures and the reducing temperature were set to 600° C. respectively. A methanol reforming catalyst 8 was prepared by using the same fabrication conditions as the Example 2 and the Example 7 except the above.

Under the test condition described later, the reformation rate of this methanol reforming catalyst 8 was 98.5% and the CO concentration in the gas reformed by this methanol reforming catalyst 8 was 2.1%.

COMPARATIVE EXAMPLE #1

The palladium aqueous solution was obtained by weighting the palladium nitrates solution [Pd(NO$_3$)$_2$ solution, Pd concentration: 26.5 wt %] 188.7 g, then mixing it with the pure water, and then stirring them sufficiently. Then, 5 weight % Pd-impregnated catalyst powders were obtained by impregnating the Ce—Zr oxide 500 g with the above palladium aqueous solution, then drying them at 150° C., and then burning them at 500° C.

Then, the Pd-impregnated catalyst micro powder slurry was obtained by grinding/mixing the resultant 5 weight % Pd-impregnated catalyst powder 100 g and the 8 weight % nitric acid alumina sol (mixed solution of boehmite alumina 13 g and 10 weight % nitric acid aqueous solution 87 g) 100 g by using the planetary ball mill for two hours.

The coat layer weight 200 g/L-substrate was obtained by coating the resultant slurry on the ceramic monolithic substrate (400 cells, 0.119 cc) to get 200 g/L as the 5 weight % Pd-impregnated catalyst powder weight, then drying it at 150° C. for 10 minutes, and then burning it at 500° C. in the air. In addition, a methanol reforming catalyst 9 of this example was prepared by reducing this coat layer weight 200 g/L-substrate in the hydrogen steam at 500° C. for one hour.

Under the test condition described later, the reformation rate of this methanol reforming catalyst 9 was 92% and the CO concentration in the gas reformed by this methanol reforming catalyst 9 was 10.5%.

COMPARATIVE EXAMPLE #2

The Cu—ZnO catalyst micro powder slurry was obtained by grinding/mixing the commercially available Cu—ZnO methanol reforming catalyst powder 100 g and the 8 weight % nitric acid alumina sol (mixed solution of boehmite alumina 13 g and 10 weight % nitric acid aqueous solution 87 g) 100 g by using the planetary ball mill for two hours.

The coat layer weight 200 g/L-substrate was obtained by coating the resultant slurry on the ceramic monolithic substrate (400 cells, 0.119 cc) to get 200 g/L as the Cu—ZnO catalyst powder weight, then drying it at 150° C. for 10 minutes, and then burning it at 500° C. in the air. In addition, a methanol reforming catalyst 10 of this example was prepared by reducing this coat layer weight 200 g/L-substrate in the hydrogen stream at 400° C. for one hour.

Under the test condition described later, the reformation rate of this methanol reforming catalyst 10 was 85% and the CO concentration in the gas reformed by this methanol reforming catalyst 10 was 1.1%.

COMPARATIVE EXAMPLE #3

The palladium aqueous solution was obtained by weighting the palladium nitrates solution [Pd(NO$_3$)$_2$ solution, Pd concentration: 26.5 wt %] 188.7 g, then mixing it with the pure water, and then stirring them sufficiently. Then, 5 weight % Pd-impregnated catalyst powders were obtained by impregnating the zinc oxide (ZnO) powders 500 g with the above palladium aqueous solution, then drying them at 150° C., and then burning them at 500° C.

Then, the Pd-impregnated catalyst micro powder slurry was obtained by grinding/mixing the resultant 5 weight % Pd-impregnated catalyst powders 100 g and the 8 weight % nitric acid alumina sol (mixed solution of boehmite alumina 13 g and 10 weight % nitric acid aqueous solution 87 g) 100 g by using the planetary ball mill for two hours.

The coat layer weight 200 g/L-substrate was obtained by coating the resultant slurry on the ceramic monolithic substrate (400 cells, 0.119 cc) to get 200 g/L as the 5 weight % Pd-impregnated catalyst powder weight, then drying it at 150° C. for 10 minutes, and then burning it at 500° C. in the air. In addition, a methanol reforming catalyst 11 of this example was prepared by reducing this coat layer weight 200 g/L-substrate in the hydrogen stream at 500° C. for one hour.

Under the test condition described later, the reformation rate of this methanol reforming catalyst 11 was 89% and the CO concentration in the gas reformed by this methanol reforming catalyst 11 was 2.4%.

[Test Conditions]

The reformation rate of the reforming catalysts obtained by the Examples 1 to 8 and the Comparative Examples 1 to 3 were measured based on the auto thermal reaction, which performed the steam reformation and the partial oxidation reaction simultaneously.

The reforming reaction of the methanol is caused in compliance with following reactions. In this case, an amount of added steam is set to a theoretical value and an amount of oxygen is set to ⅓ of the theoretical value.

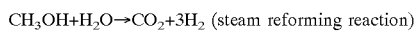

$CH_3OH+H_2O \rightarrow CO_2+3H_2$ (steam reforming reaction)

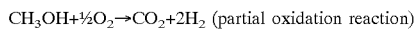

$CH_3OH+\tfrac{1}{2}O_2 \rightarrow CO_2+2H_2$ (partial oxidation reaction)

The reformation rate is calculated by detecting an amount of the residual methanol by using the gas chromatograph. The reforming temperature is set to 400° C. at the catalyst inlet port, and LHSV (a value of a supplied liquid amount to a catalyst volume per unit time) is set to 4 hr-1. Results are shown in Table of FIG. 4. According to these Examples and Comparative Examples, following knowledge can be obtained.

According to the comparison between the Comparative Example 1 and the Examples 1 to 8, it can be seen that a large quantity of CO was generated by the catalyst in the Comparative Example 1, in which the Ce—Zr complex oxide support is impregnated with Pd single substance, whereas the CO concentration in the reformed gas can be considerably reduced by the catalysts in the Examples 1 to 8 using the Pd—Zn alloy.

According to the comparison between the Comparative Example 2 and the Examples 1 to 8, it can be seen that the good reformation rate is not obtained by the conventional Cu—ZnO based catalyst in the high temperature oxidizing atmosphere such as the above test conditions whereas the good reformation rate is obtained in all the Examples 1 to 8.

The catalyst of the Comparative Example 3, in which ZnO is impregnated with Pd, can reduce the CO concentration in the reformed gas lower than the Comparative Example 1, but the reformation rate in the Comparative Example 3 is apparently lower than the Examples 1 to 8.

Also, based on the result of the Examples 1 to 3, there is a tendency such that the good reforming reaction was accelerated in all the Examples 1 to 3 and particularly the CO concentration was reduced smaller as the Zn/Pd mole ratio become larger.

Based on the result of the Examples 2, 4 to 6, there is another tendency such that the good reforming reaction is also accelerated in all the Examples 2, 4 to 6. Particularly the Pd—Zn—Ce—Zr based compound reduces the CO concentration in the reformed gas effectively.

Based on the result of the Examples 2, 7 and 8, there is still another tendency such that the good reforming reaction is also accelerated in all the Examples 2, 7 and 8 and particularly the CO concentration is reduced smaller as the burning or reducing temperatures were set higher.

As described above, according to the catalyst of the present invention, since the partial oxidation reaction as the exothermic reaction can be induced simultaneously with the steam reforming reaction or prior to the steam reforming reaction, provision of the heater such as the burner, etc. used to start/maintain the reforming reaction can be omitted, and thus the methanol reforming apparatus and the methanol reforming method, that is excellent in the energy conversion efficiency and is ready to reduce a size with a simple configuration, can be provided.

Also, the high activity and high selectivity methanol reforming catalyst capable of maintaining the high activity with good stability in the high temperature and oxygen sufficient atmosphere such as the partial oxidation reaction as one of the reforming reactions can be provided.

The entire contents of Japanese Patent Applications P11-356633 (filed Dec. 15, 1999) and P2000-368626 (filed Dec. 4, 2000) are incorporated herein by reference. Although the invention has been described above by reference to certain embodiments of the invention, the invention is not limited to the embodiments described above. Modifications and variations of the embodiments described above will occur to those skilled in the art, in light of the above teachings.

For instance, if the reforming apparatus of the present embodiment is coupled with the CO sifting reactor which execute the CO partial oxidation reaction, the water-gas shift reaction, etc, the CO concentration in the resultant reformed gas can be reduced. In addition, if the reforming apparatus of the present embodiment is combined with the fuel cell, especially the solid-state polymer electrolyte fuel cell, a small power generating system can be implemented with a simple configuration. Such power generating system is promising as a power source of the electric car.

What is claimed is:

1. A method of producing a methanol reforming catalyst, comprising:

preparing a metal oxide support using powder selected from the group consisting of Ce oxide powder and Ce—Zr complex oxide powder to provide the support consisting essentially of a material selected from the group consisting of Ce oxide and Ce—Zr complex oxide;

impregnating the metal oxide support with Pd and Zn;

forming a slurry including the metal oxide support;

coating the slurry on a monolithic substrate; and burning the metal oxide support that is impregnated with Pd and Zn, wherein the forming a slurry further comprises:

mixing the metal oxide support impregnated with Pd and Zn with nitric acid containing one of alumina and silica.

2. The method according to claim 1, wherein a burning temperature used in the burning step is 400 to 600° C.

3. The method of claim 2, further comprising:
reducing the metal oxide at 400 to 600° C.

4. The method of claim 1, further comprising:
burning the slurry coated monolithic substrate.

5. The method of claim 4, wherein the burning temperature used in the burning the slurry coated monolithic substrate is about 400° C.

6. A method of producing a methanol reforming catalyst, comprising:
preparing a metal oxide support using powder selected from the group consisting of Ce oxide powder, Zr oxide powder and Ce—Zr complex oxide powder to provide the support consisting essentially of a material selected from the group consisting of Ce oxide, Zr oxide and Ce—Zr complex oxide;
impregnating the metal oxide support with Pd and Zn; and
burning the metal oxide support that is impregnated with Pd and Zn,
wherein the impregnating step first impregnates the metal oxide support with a Zn-containing solution and then impregnates the metal oxide support with a Pd-containing solution.

7. The method according to claim 6, wherein a burning temperature used in the burning step is 400 to 600° C.

8. The method of claim 7, further comprising:
reducing the metal oxide at 400 to 600° C.

9. The method of claim 6, further comprising:
forming a slurry including the metal oxide support coating the slurry on a monolithic substrate.

10. The method of claim 9, further comprising:
burning the slurry coated monolithic substrate.

11. The method of claim 10, wherein the burning temperature used in the burning the slurry coated monolithic substrate is about 400° C.

12. The method of claim 9, wherein the forming a slurry further comprises:
mixing the metal oxide support impregnated with Pd and Zn with nitric acid containing one of the alumina and silica.

* * * * *